(12) United States Patent
Humphrey

(10) Patent No.: US 8,232,205 B2
(45) Date of Patent: Jul. 31, 2012

(54) METHODS OF MANUFACTURING A HONEYCOMB EXTRUSION DIE

(75) Inventor: Mark Lee Humphrey, Elmira, NY (US)

(73) Assignee: Corning Incorporated, Corning, NY (US)

( * ) Notice: Subject to any disclaimer, the term of this patent is extended or adjusted under 35 U.S.C. 154(b) by 396 days.

(21) Appl. No.: 12/547,071

(22) Filed: Aug. 25, 2009

(65) Prior Publication Data

US 2011/0049103 A1    Mar. 3, 2011

(51) Int. Cl.
*H01L 21/44* (2006.01)
(52) U.S. Cl. ........ 438/678; 438/115; 438/691; 438/696; 257/690; 257/697; 257/735
(58) Field of Classification Search .......... 257/676, 257/778, 788, 783, 784, 786, 779, 679, 692, 257/690, 735, 693, 696, 731, 733, 734; 438/48, 438/118, 121, 119, 108, FOR. 369, FOR. 370, 438/115, 12, 13, 691, 694, 696, 697, 678
See application file for complete search history.

(56) References Cited

U.S. PATENT DOCUMENTS

| 3,440,388 | A | 4/1969 | Otstot et al. | |
|---|---|---|---|---|
| 4,287,749 | A | 9/1981 | Bachrach et al. | |
| 4,574,459 | A | 3/1986 | Peters | |
| 5,026,422 | A | 6/1991 | Osborne | |
| 7,952,208 | B2 * | 5/2011 | Fujita et al. | 257/778 |
| 2003/0042229 | A1 * | 3/2003 | Marcher | 219/69.17 |
| 2005/0110507 | A1 * | 5/2005 | Koizumi et al. | 324/754 |
| 2006/0091016 | A1 | 5/2006 | Avery et al. | |

FOREIGN PATENT DOCUMENTS

GB    2241186 A    8/1991
GB    2349106 A    10/2000

* cited by examiner

*Primary Examiner* — Ha Tran T Nguyen
*Assistant Examiner* — Thanh Y Tran
(74) *Attorney, Agent, or Firm* — Robert P. Santandrea

(57) ABSTRACT

Methods of manufacturing a honeycomb extrusion die comprise the steps of coating at least a portion of a die body with a layer of conductive material and modifying the die body with an electrical discharge machining technique. The method then further includes the step of chemically removing the layer of conductive material, wherein the residual material from the electrical discharge machining technique is released from the die body.

19 Claims, 4 Drawing Sheets

METHODS OF MANUFACTURING A HONEYCOMB EXTRUSION DIE

FIELD

The present invention relates generally to methods of manufacturing a honeycomb extrusion die, and more particularly, to methods of manufacturing, including the steps of coating at least a portion of a die body with a layer of conductive material prior to modifying the die body with an electrical discharge machining technique.

BACKGROUND

Conventional methods are known to manufacture a honeycomb extrusion die. Known electrical discharge machining techniques are commonly used to modify a die body during the manufacturing process. Once complete, the honeycomb extrusion die can facilitate extrusion of a honeycomb body that may be useful for various filtering applications.

SUMMARY

In one example aspect, a method of manufacturing a honeycomb extrusion die comprises the step of providing a die body including a plurality of die pins having side walls defining an intersecting array of discharge slots extending into the die body. The method further includes the step of coating at least a portion of the die body with a layer of conductive material. The method then includes the step of modifying the die body with an electrical discharge machining technique. Residual material from the electrical discharge machining technique is deposited on the layer of conductive material. The method then further includes the step of chemically removing the layer of conductive material, wherein the residual material is released from the die body.

In another example aspect, a method of manufacturing a honeycomb extrusion die includes the step of providing a die body including a plurality of die pins having side walls defining an intersecting array of discharge slots extending into the die body. The method further includes the step of coating at least the side walls of the plurality of die pins with a layer of metal using electroless plating. The method then includes the step of modifying the die body with a plunge electrical discharge machining technique. Residual material from the electrical discharge machining technique is deposited on the layer of conductive metal. The method then further includes the step of chemically removing the layer of conductive metal, wherein the residual material is released from the die body.

In yet another example aspect, a method of manufacturing a honeycomb extrusion die includes the step of providing a die body including a plurality of die pins having side walls defining an intersecting array of discharge slots extending into the die body. The method further includes the step of coating at least the side walls of the plurality of die pins with a layer of nickel using electroless nickel plating. The layer of nickel has a substantially constant thickness from about 0.5 mils to about 4 mils. The method then includes the step of modifying the die body with a plunge electrical discharge machining technique wherein residual material from the electrical discharge machining technique is deposited on the layer of nickel. The method then includes the step of chemically removing the layer of nickel, wherein the residual material is released from the die body.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

Figure 1:
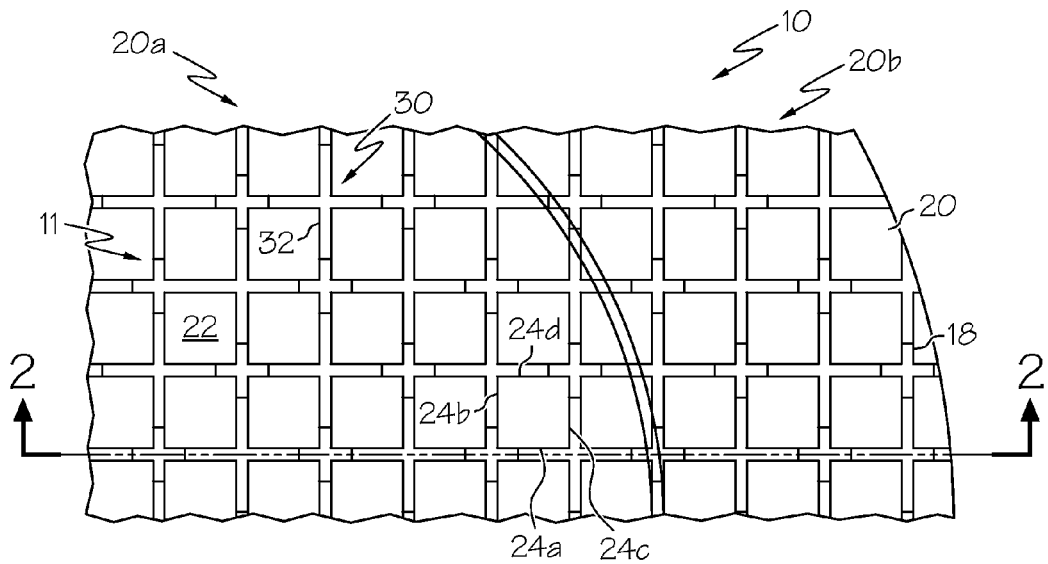
FIG. 1 is a partial plan view of a die body of a honeycomb extrusion die.

The present invention will now be described more fully hereinafter with reference to the accompanying drawings in which example embodiments of the invention are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Figure 2:
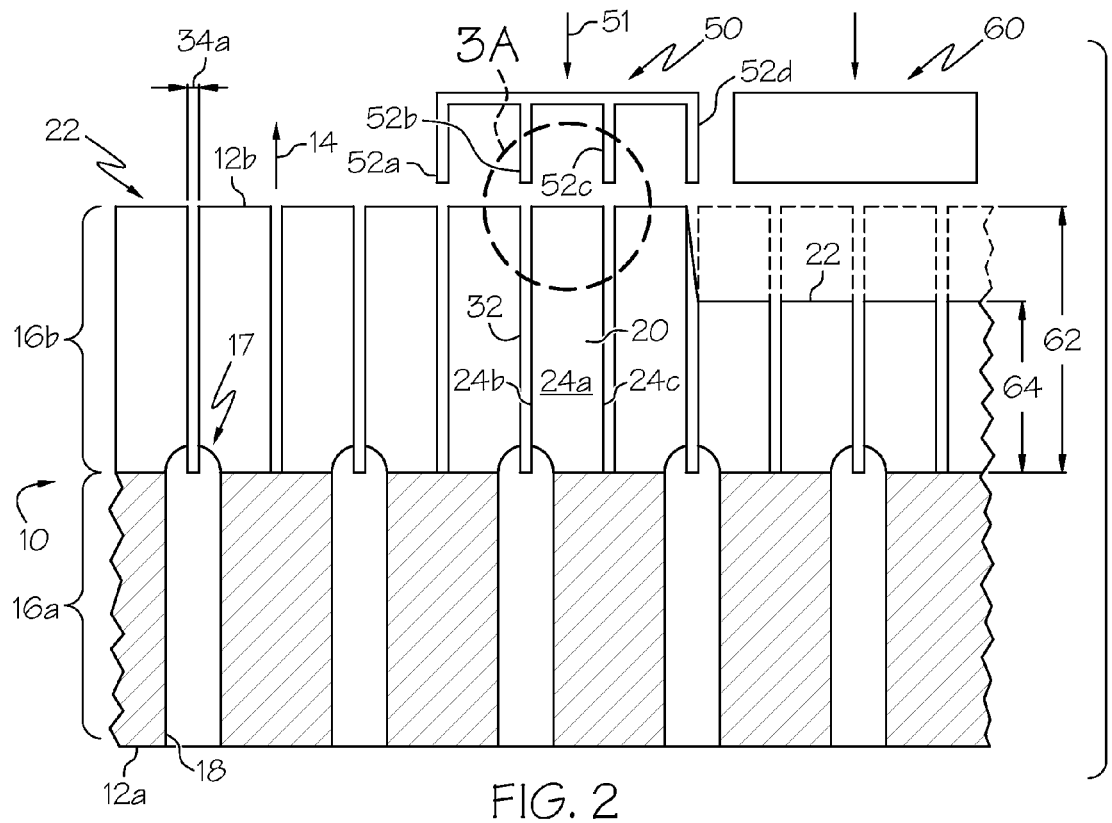
FIG. 2 is a sectional view of the die body along line 2-2 of FIG. 1.

FIGS. 1 and 2 illustrate a die body 10 of a honeycomb extrusion die. The die body includes an inlet end 12a and a discharge end 12b opposite the inlet end 12a in an extrusion direction 14. The die body 10 includes an inlet region 16a, beginning at the inlet end 12a, that defines a plurality of feed holes 18 extending from the inlet end 12a. The plurality of feed holes 18 are configured to receive batch material from an outlet port of the extrusion device (not shown). The die body 10 further includes a discharge region 16b terminating at the discharge end 12b. The discharge region 16b includes a plurality of die pins 20. Each die pin 20 includes an end face 22 positioned along a discharge face 11 (see FIG. 1) of the die body 10.

The plurality of die pins 20 includes a first set of die pins 20a circumscribed by a second set of die pins 20b. As shown in FIG. 1, the first set of die pins 20a can be formed as an inner circular zone of die pins while the second set of die pins 20b can comprise an outer circular zone of die pins. It will be appreciated that the first and second zone can comprise various noncircular shapes depending on the desired shape of the cylindrical honeycomb bodies extruded with the die body. As shown, the end faces 22 of the second set of die pins 20b can be substantially coplanar and configured to receive a mask member, a shim and/or other components. The honeycomb extrusion die can be considered the die body 10 alone or the die body 10 in combination with the mask member, shim and/or other optional components.

Each die pin 20 also includes side walls 24a, 24b, 24c, 24d defining an intersecting array 30 (See FIG. 1) of discharge slots 32 extending into the die body 10 from the discharge face 11. The discharge slots 32 can connect with the feed holes 18 at feed hole and discharge slot intersections 17 at an interface within the die body 10 between the inlet region 16a and the discharge region 16b.

Figure 4:
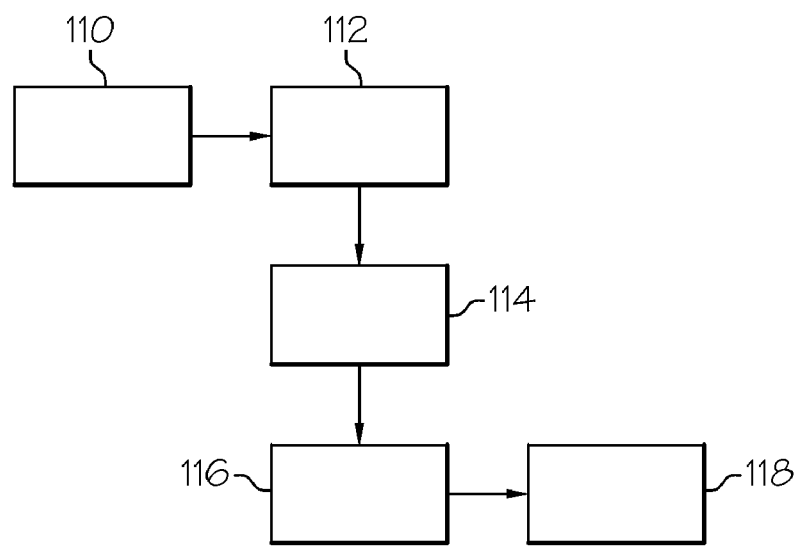
FIG. 4 is a flow chart representing example steps of manufacturing a honeycomb extrusion die.

FIG. 4 provides a flow chart of a method of manufacturing a honeycomb extrusion die. As shown, the method can comprise step 110 of manufacturing a die body 10 from a block of material. In one example, full depth slot forming of the discharge slots 32 may be carried out such that the discharge slots 32 intersect with feed holes 18 bored into the inlet region 16a of the block. A die body 10 similar to FIGS. 1 and 2 can then be provided, although other die block configurations may be provided in further examples. In the illustrated example, the die body 10 can be provided with the plurality of die pins 20 with the side walls 24a, 24b, 24c, 24d defining the intersecting array 30 of discharge slots 32 extending into the die body 10.

As shown in FIG. 4, after the die body 10 is provided, the method can then include the step 112 of coating at least a portion of the die body 10 with a layer of conductive material 40. The conductive material can comprise various materials capable of conducting electricity to facilitate the electrical discharge machining technique discussed below. For instance, the conductive material 40 can comprise metal [e.g., at least one of nickel, copper, chromium, noble metals, and/or other metals or alloys thereof] and/or other conductive materials.

Various techniques may be used to coat at least portions of the die body 10 with the conductive material 40. For example, the coating process can comprise at least one of electroless plating, electroplating, chemical vapor deposition (CVD), physical vapor deposition (PVD) or other techniques and combinations thereof For instance, electroless nickel plating can be used to coat the portion of the die body with a layer of nickel-phosphorus or nickel-boron alloy. U.S. Patent Application Publication No. US2006/0091016, herein incorporated by reference in its entirety, discloses an example method and apparatus that may be used to plate the die body.

Figure 3A:
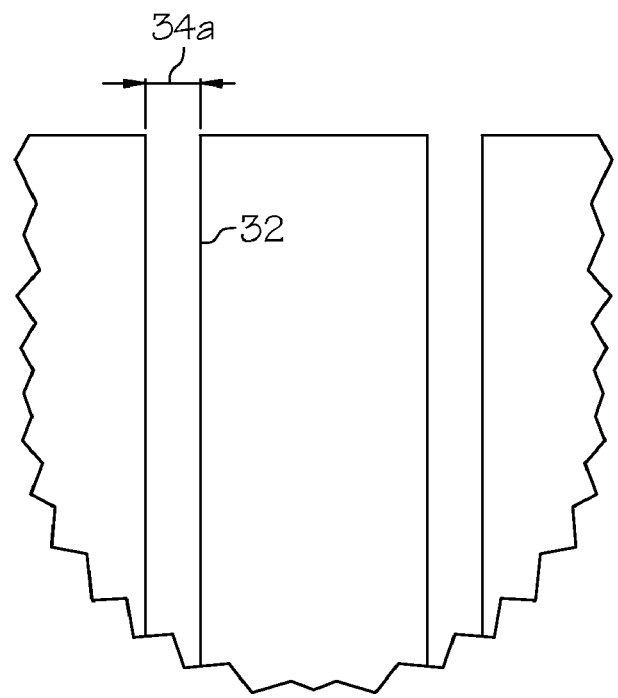
FIG. 3A is an enlarged view of portions of the die body of FIG. 2.
Figure 3B:
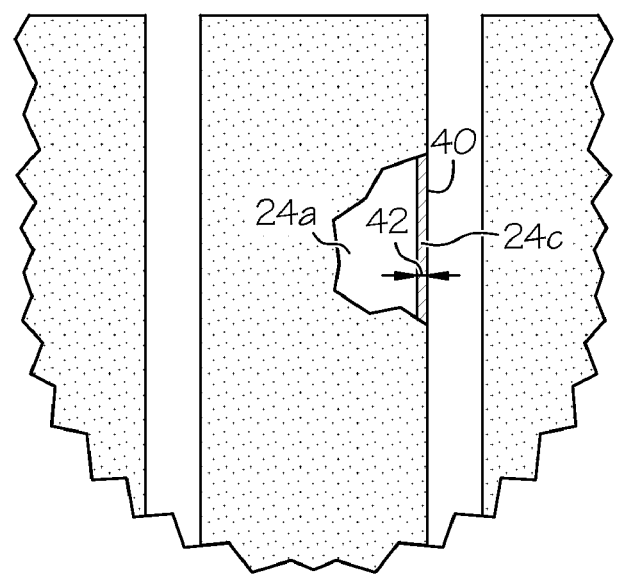
FIG. 3B is an enlarged view of FIG. 3A with a layer of conductive material applied to side walls of the plurality of die pins.

Still further, the entire die body 10 or only portions of the die body 10 may be coated with the layer of conductive material 40. As shown in FIG. 3B, a portion of the layer of conductive material 40 is shown broken away to illustrate that the side walls 24a and 24c of the plurality of die pins 20 are coated with a layer of conductive material. In a similar manner, the illustrated example also coats the end face 22, the side walls 24b and 24d and other exposed surfaces of the die body 10 with the layer of conductive material 40. As shown in FIG. 3B, the layer of conductive material 40 may have a substantially constant thickness 42 although the thickness may not be consistently disposed in further examples. Moreover, the layer may have various thicknesses. As such, the layer of conductive material may have a target thickness for exposed surfaces of the die body or portions of the die body. Once coated with the layer, the actual thickness of the conductive layer of material may vary such that a substantial portion of the layer of conductive material is within an actual range of thicknesses. For instance, the layer of conductive material 40 may have a thickness 42 within an actual range from about 0.5 mils to about 4 mils, such as from about 0.5 mils to about 1 mil. In another example, the layer of conductive material 40 may have a target thickness of 1 mil. After coating with this target thickness, the actual thickness of the layer of conductive material 40 can be within an actual range from about 0.7 mils to about 1.3 mils.

Figure 3C:
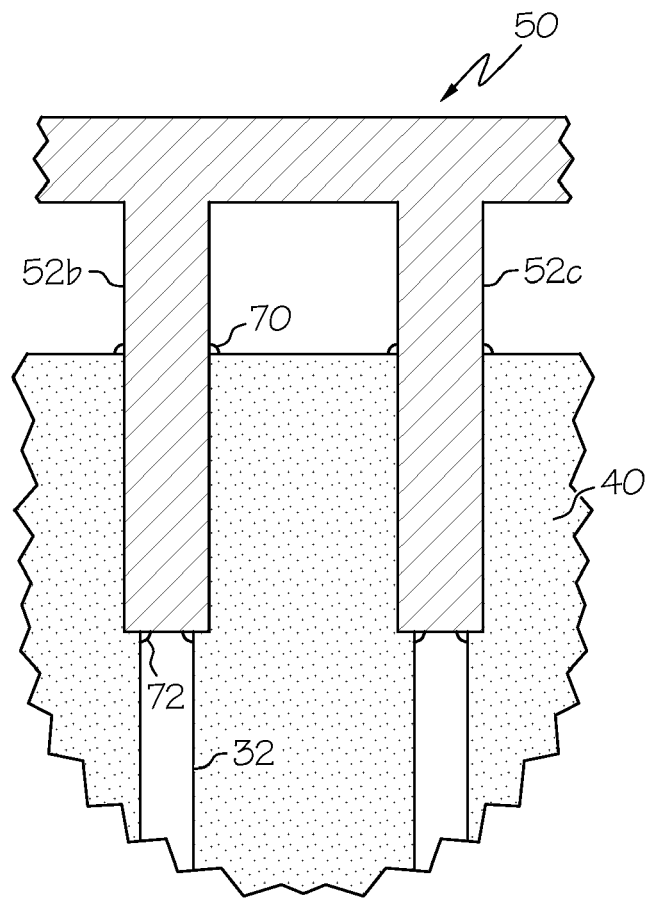
FIG. 3C is a schematic illustration of the die body being modified with an plunge electrical discharge machining technique.
Figure 3D:
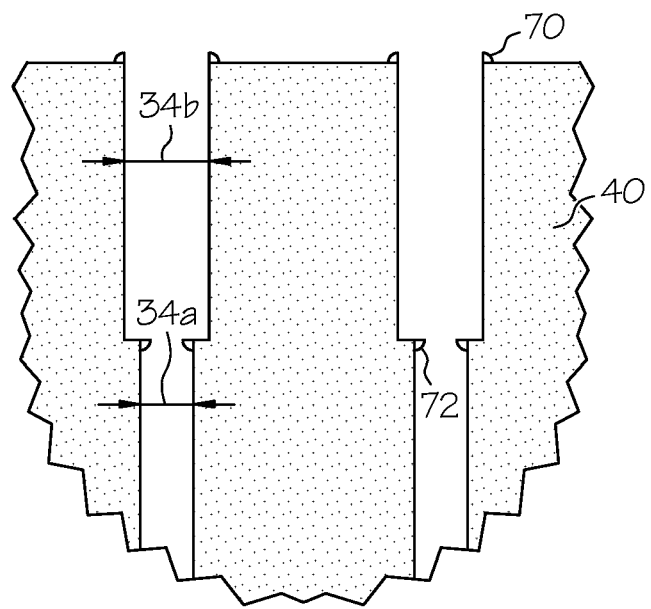
FIG. 3D is a schematic illustration of the die body with residual material from the electrical discharge machining technique being deposited on the layer of conductive material.
Figure 3E:
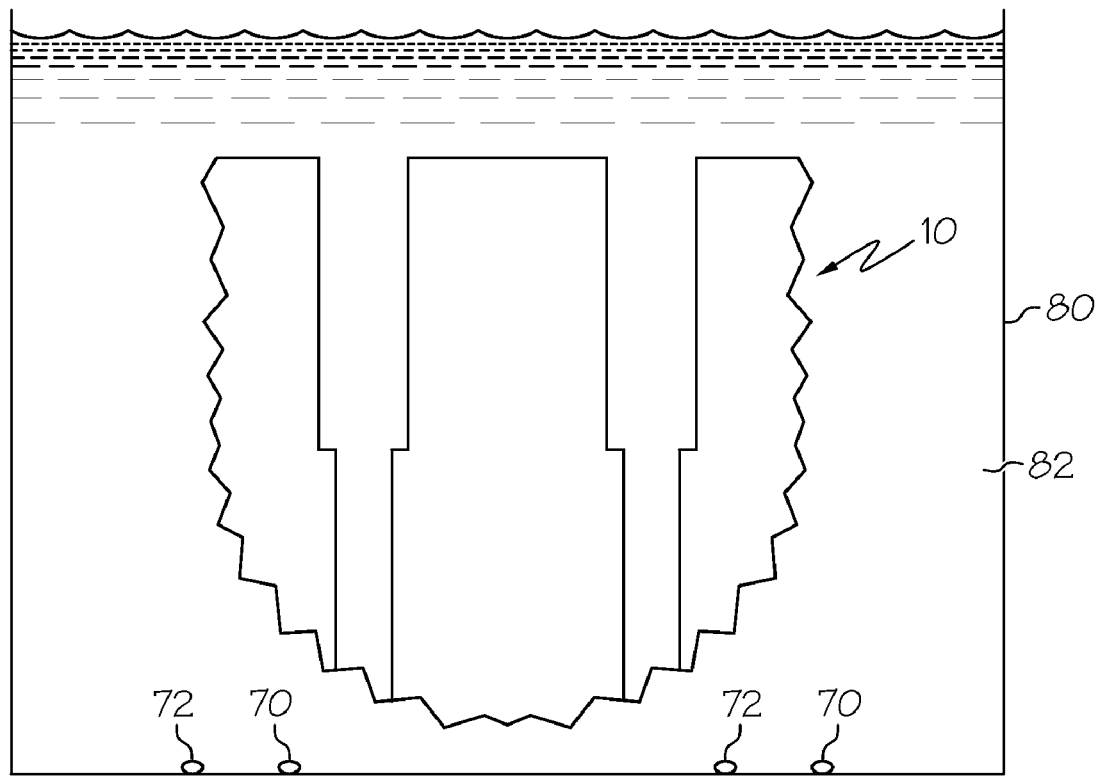
FIG. 3E is a schematic illustration of the layer of conductive material being chemically removed, wherein the residual material is released from the die body.

As further shown in FIG. 4, after step 112, the method can then include the step 114 of modifying the die body 10 with an electrical discharge machining technique. Various electrical discharge machining techniques may be employed. For example, as shown in FIGS. 2 and 3C, plunge electrical discharge machining can be used to modify the die body. One example schematic electrode 50 is illustrated in FIG. 2 including web portions 52a, 52b, 52c, 52d. Once plunged in direction 51, web portions 52a, 52b, 52c increase the width of the corresponding discharge slots 32 from an initial slot thickness 34a to an enlarged slot thickness 34b (see FIG. 3D). In one example, the lower portion of the discharge slots 32 can include the initial slot thickness 34a while an upper portion of the discharge slot 32 includes the enlarged slot thickness 34b. As shown, the width of a plurality of slots can be increased although a single slot width can be increased in further examples. Moreover, as shown, the width of an outer band of discharge slots 32 can be increased although other slot locations can be increased in further examples. Enlarging an outer band of discharge slots can help extrude a honeycomb body with increasing wall thicknesses in the peripheral region of the die body. The increased wall thicknesses can strengthen the honeycomb network and/or strengthen a connection between the network and an outer skin layer, if provided.

The schematic electrode 50 can further include a skin forming electrode 52d. Once the electrode 50 is plunged in direction 51, a skin forming peripheral region is created to define the outer periphery of the honeycomb body. Indeed, the skin forming peripheral region, if provided, can facilitate coextruding of the skin with the honeycomb network. Therefore, the honeycomb body can be provided with an outer skin to form an outer surface of the body. The skin forming electrode 52d can extend in an arc or circular path to provide a honeycomb extrusion with a circular cross sectional shape. In further examples, the skin forming electrode 52d can have other shaped depending on the desired shape of the skin layer.

In another example (also shown in FIG. 2), an electrode 60 can be provided to reduce a height of the second set of die pins 20b from an initial height 62 to the illustrated final height 64. Thus, an initial die body 10 can be provided and then the electrode 60 can be plunged downward in direction 61 to reduce the height of the second set of die pins 20b.

As shown in FIG. 3C, during the electrical discharge machining techniques discussed above, residual material 70, 72 from the electrical discharge machining technique can be deposited on the layer of conductive material 40. Indeed, upper residual material 70 may be disposed about the entrance into the die body while lower residual material 72 may form below the enlarged upper portion of the discharge slot and/or at a transition between the upper and lower portions of the discharge slot. As shown, the residual material 70, 72 comprises sputter from the electrical discharge machining technique. The sputter can comprise machined portions of the die body 10, although the sputter can also comprise portions of the electrode, portions of the conductive material 40 and/or other sources of material. During the electrical discharge machining process, removed portions of the die body can be melted away. Accordingly, the sputter can also comprise molten residual material 70, 72 that is solidified after being deposited on the layer of conductive material 40.

As shown in FIG. 4, after the step 114, the method can then include the step 116 chemically removing the layer of conductive material 40. As the residual material 70, 72 is at least partially or entirely disposed on the conductive material, removal of the conductive material will facilitate release of the residual material 70, 72 from the die body 10. The conductive material 40 may be removed in a wide variety of ways depending on the nature of the conductive material 40. Layers applied by chemical vapor deposition may be removed by an ozone gas process. In another example, as shown, the die body 10 can be submerged in a bath 80 of fluid, such as the illustrated liquid 82, to remove the conductive material 40 from the die body 10. Although not shown, an agitator may be provided to help move the fluid through the slots and other spaces of the die body. Various chemicals can be used to remove the layer of conductive material. For example, the layer of conductive material can be removed by at least one of an acid, a base, an oxidizing liquid and an oxidizing gas. In further examples, other formulations available from plating solution vendors can be used to remove the layer of conductive material. For example, if the die body 10 is formed from stainless steel, any oxidizing acid such as nitric, sulfuric or other acids may be used. For stripping nickel or copper from a steel die body 10, a heated aqueous solution consisting of a blend of the following can be used: sodium cyanide, nitrobenzene sulfonic acid, or sodium hydroxide. meta-Nitrobenzonic acid (MNBA) can also be used in further examples. When removing copper from the die body, sodium cyanide solutions, hydrogen peroxide, room temperature nitric acid, or most oxidizing acids may be used to varying degrees (phosphoric, chromic, etc.). Sodium hydroxide 2 N at 70° C. can also be used.

In the illustrated example, the liquid 82 comprises nitric acid used to remove the nickel layer of conductive material 40. As shown, once removed, the residual material 70, 72 can be released and may collect at the bottom of the bath 80. The residual material 70, 72 can be spontaneously released as the conductive material 40 is removed. In further examples, agitation of the liquid, shaking of the bath or other factors may be employed to help release the residual material 70, 72. In further examples, contaminants from sources other than the electrical discharge machining technique can be released. For example, debris, residue or other contaminants on the conductive layer may be removed.

As shown in FIG. 4, after step 114, the die body 10 can be removed from the bath 80 and, if necessary, further die manufacturing steps can be carried out at step 118. For example, dowel holes, threaded holes, perimeter grooves or other structures may be machined into the die body to facilitate alignment and mounting of the die body with respect to the extrusion apparatus. In further examples, subsequent process steps may be used to control the final slot width (e.g., with an electroless nickel plating process). In further examples, subsequent process steps can include providing the die body 10 with a wear resistant coating, e.g., by way of a chemical vapor deposition technique.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of manufacturing a honeycomb extrusion die, the method comprising the steps of:
    providing a die body including a plurality of die pins having side walls defining an intersecting array of discharge slots extending into the die body;
    coating at least a portion of the die body with a layer of conductive material; then,
    modifying the die body with an electrical discharge machining technique wherein residual material from the electrical discharge machining technique is deposited on the layer of conductive material; and then,
    chemically removing the layer of conductive material, wherein the residual material is released from the die body.

2. The method of claim 1, wherein the layer of conductive material comprises a metal.

3. The method of claim 2, wherein the metal comprises at least one of nickel, copper, chromium, a noble metal, alloys thereof, and combinations thereof 4. The method of claim 1, wherein the step of coating comprises at least one of electroless plating, electroplating, chemical vapor deposition, physical vapor deposition, and combinations thereof 5. The method of claim 1, wherein the layer of conductive material has a substantially constant thickness.

6. The method of claim 1, wherein the layer of conductive material has a thickness within a range from about 0.5 mils to about 4 mils.

7. The method of claim 1, wherein the layer of conductive material is removed by at least one of an acid, a base, an oxidizing liquid, and an oxidizing gas.

8. The method of claim 7, wherein an oxidizing acid is used to chemically remove the layer of conductive material.

9. The method of claim 1, wherein the residual material comprises sputter from the electrical discharge machining technique, wherein the sputter comprises at least one of a portion of the die body, electrode material and a portion of the conductive material.

10. A method of manufacturing a honeycomb extrusion die, the method comprising the steps of:
    providing a die body including a plurality of die pins having side walls defining an intersecting array of discharge slots extending into the die body;
    coating at least the side walls of the plurality of die pins with a layer of conductive metal using electroless plating; then,
    modifying the die body with a plunge electrical discharge machining technique wherein residual material from the electrical discharge machining technique is deposited on the layer of conductive metal; and then,
    chemically removing the layer of conductive metal, wherein the residual material is released from the die body.

11. The method of claim 10, wherein the layer of conductive metal comprises at least one of nickel, copper, chromium, a noble metal, alloys thereof, and combinations thereof 12. The method of claim 10, wherein the layer of conductive metal has a substantially constant thickness.

13. The method of claim 10, wherein the layer of conductive metal has a thickness within a range from about 0.5 mils to about 4 mils.

14. The method of claim 10, wherein the layer of conductive material is removed by at least one of an acid, a base, an oxidizing liquid, and an oxidizing gas.

15. The method of claim 14, wherein an oxidizing acid is used to chemically remove the layer of conductive metal.

16. A method of manufacturing a honeycomb extrusion die, the method comprising the steps of:
    providing a die body including a plurality of die pins having side walls defining an intersecting array of discharge slots extending into the die body;
    coating at least the side walls of the plurality of die pins with a layer of nickel using electroless nickel plating, wherein the layer of nickel has a substantially constant thickness from about 0.5 mils to about 4 mils; then,
    modifying the die body with a plunge electrical discharge machining technique wherein residual material from the electrical discharge machining technique is deposited on the layer of nickel; and then, chemically removing the layer of nickel, wherein the residual material is released from the die body.

17. The method of claim 16, wherein the layer of nickel has a substantially constant thickness.

18. The method of claim 16, wherein the layer of nickel has a thickness within a range from about 0.5 mils to about 4 mils.

19. The method of claim 16, wherein an oxidizing acid is used to chemically remove the layer of nickel.

* * * * *